*United States Patent* [19]

Goto et al.

[11] Patent Number: 5,150,343
[45] Date of Patent: Sep. 22, 1992

[54] MINIATURIZED LOW-POWER-CONSUMPTION OPTICAL HEAD PROVIDED WITH A STATE TRANSFORMATION MECHANISM

[75] Inventors: Yoshikazu Goto; Satoshi Kikuya; Benichi Miyazaki, all of Osaka, Japan

[73] Assignee: Matsushita Electric Industrial Co., Ltd., Kadoma, Japan

[21] Appl. No.: 554,337

[22] Filed: Jul. 19, 1990

[30] Foreign Application Priority Data

Jul. 19, 1989 [JP] Japan ................................ 1-186403
Jul. 19, 1989 [JP] Japan ................................ 1-186404

[51] Int. Cl.⁵ .................................................. G11B 7/00
[52] U.S. Cl. ............................ 369/44.22; 369/44.14; 369/44.17; 369/32; 359/824
[58] Field of Search .............. 369/44.11, 44.14, 44.15, 369/44.16, 44.17, 44.18, 44.19–44.22, 32; 350/245, 247, 252, 255, 248; 359/812–824

[56] References Cited

U.S. PATENT DOCUMENTS

| | | | |
|---|---|---|---|
| 4,443,721 | 4/1984 | Jansen .......................... | 369/44.16 |
| 4,646,283 | 2/1987 | Ito et al. ....................... | 369/44.15 |
| 4,694,442 | 9/1987 | Gijzen et al. .................. | 369/44.32 |
| 4,766,583 | 8/1988 | Oinoue ......................... | 369/44.16 |
| 4,773,062 | 9/1988 | Wada et al. ................... | 369/44.16 |
| 4,794,580 | 12/1988 | Ikedo et al. .................. | 369/44.16 |
| 4,842,392 | 6/1989 | Nakamura et al. ............ | 350/247 |
| 4,911,534 | 3/1990 | Henegouwen et al. ......... | 369/44.16 |
| 4,916,684 | 4/1990 | Odawara et al. .............. | 369/44.19 |
| 4,942,562 | 7/1990 | Suzuki ........................... | 369/44.21 |
| 4,948,230 | 8/1990 | Kasahara et al. .............. | 369/44.11 |
| 4,991,161 | 2/1991 | Ikegame et al. ............... | 369/44.15 |
| 5,063,548 | 11/1991 | Yamashita et al. ............ | 369/32 |

FOREIGN PATENT DOCUMENTS

| | | | |
|---|---|---|---|
| 0290979 | 11/1988 | European Pat. Off. ......... | 369/44.14 |
| 0177434 | 9/1905 | Japan ............................. | 369/44.14 |
| 0215081 | 12/1984 | Japan ............................. | 369/44.27 |
| 63-298821 | 12/1988 | Japan . | |

*Primary Examiner*—Roy N. Envall, Jr.
*Assistant Examiner*—Thang V. Tran
*Attorney, Agent, or Firm*—Pollock, VandeSande & Priddy

[57] ABSTRACT

An optical head which includes a movable bobbin having an objective lens and tracking coils for tracking operation, a carriage guided in such a manner to be able to move in the tracking direction and a state transformation mechanism for transforming the state of the bobbin and carriage between a first state, in which the objective lens can move in the tracking direction but the carriage does not move in the tracking direction, and a second state, in which the movable bobbin and the carriage moves in the tracking direction as one body. When effecting a tracking operation, the state transformation mechanism transforms the state of the bobbin and the carriage into the first state, in which the objective lens can move in the tracking direction but the carriage does not move in the tracking direction, and a tracking drive current is then made to flow through the tracking coils to perform the tracking operation. This results in that the objective lens is supported by a system of a single degree of freedom, of which characteristics are determined by the mass of the movable bobbin and the spring constant of the bobbin supporting means. In contrast, when effecting an access operation, the state transformation mechanism transforms the movable bobbin and the carriage into the second state, in which the bobbin and the carriage move in the tracking direction in one united body, and an access drive current is then made to flow through the tracking coils to effect the access operation. Thereby, tracking performance can be increased and a seeking operation can be performed at a high speed. Further, the tracking coil can be used to effect the access drive operation. Thus, there can be less weight of a movable part of the optical head and lower power consumption.

12 Claims, 5 Drawing Sheets

MINIATURIZED LOW-POWER-CONSUMPTION OPTICAL HEAD PROVIDED WITH A STATE TRANSFORMATION MECHANISM

BACKGROUND OF THE INVENTION

1. Field of the Invention

This invention relates to an optical head for recording information in, reproducing the information recorded in or erasing information from information tracks formed on a recording medium.

2. Description of the Related Art

Typically, a conventional optical head for use in an optical disk drive unit includes a focus drive means for moving an objective lens in the direction parallel to an optical axis thereof (hereunder sometimes referred to as the focusing direction) in order to follow axial deflection of a disk, a tracking drive means for moving the objective lens in the radial direction of the disc (hereunder somtimes referred to as the tracking direction) to follow an information track having a dynamic radial runout therein and an access drive means for moving an optical unit containing the focus drive means and the tracking drive means to an information track to be followed (hereunder sometimes referred to simply as a target track). The objective lens is supported by the optical unit through an elastic supporting member such as a plate spring. Further, each of the focus drive means, the tracking drive means and the access drive means is generally constructed in such a manner to arrange a movable coil in magnetic flux of a magnetic circuit and generate driving force by energizing the coil.

Further, a seek operation of an optical head following a track is performed as follows. First, the tracking drive means is once disconnected or deenergized while the focus drive means operates to effect a focus control operation. Then, the access drive means is energized to move the optical head to the neighborhood of the target track. Thereafter, the tracking drive means is energized to be in operation. Thus, is read the address of the track which the optical head reaches. If the read address is not equal to that of the target track, what is called a "track jumping operation" is performed by using the tracking drive means to find the target track. Finally, the optical unit reaches the target track and thus the seek operation is completed.

When the optical head is moved by using the access drive means, it is preferable that the objective lens does not rock in the tracking direction but moves together with the optical unit, i.e., the objective lens and the optical unit are rigidly connected with each other. This is because of the fact that when the objective lens rocks in the tracking direction, there occur disadvantages that the address of the track, which the optical unit reaches, is largely different from that of the target track, that what is called a "tracking-pull-in operation" becomes unstable and that a seek time increases.

Further, it is desirable that the objective lens is supported in the tracking direction in the vibration state of a system of single degree of freedom. If supported in the vibration of a system of multi-degree of freedom, there occur many resonance modes and thus a tracking control system becomes unstable.

As an example of a conventional system for suppressing the rocking motion of the objective lens in the tracking direction at the time of moving the optical unit, is cited a system disclosed in Japanese Patent Provisional Publication No. 63-298821 Official Gazette. In this system, the whole of an optical system having both an objective lens and a tracking drive means is included in an optical unit provided with an access drive means. Further, a tracking control means for controlling the movement of the objective in the tracking direction is mounted on the optical unit. This tracking control means is made up of a solenoid type electromagnet. When the electromagnetic is energized, a solenoid pin is protruded and is engaged with a groove of a supporting member for supporting the objective lens in such a manner to be able to move in the tracking direction, thereby controlling the movement of the objective lens. That is, this system energizes the tracking control means to suppress the rocking motion of the objective lens at the time of performing an access operation. In contrast, during the tracking operation, this system deenergizes the tracking control means and effects a tracking control operation. This conventional system, however, has defects that if the mass of the whole optical unit, which moves at the time of effecting an access operation as above described, is not far greater than that of the objective lens, the objective lens is not supported by a system of single degree of freedom and further the optical unit a becomes a system of double degree of freedom and as a result the tracking control operation becomes unstable, that it is therefore difficult to decrease the mass of such a movable portion at the time of getting an access to an information track and that in addition, the access drive means is large in size and requires considerable drive electric power. That is, the prior art has drawbacks in that it is difficult to miniaturize an optical disk drive unit and decrease power consumption thereof.

Regarding the miniaturization of an optical disk drive unit, a separate type optical head has been proposed, in which the optical system is separated from the residual portions thereof and only the focus drive means, the tracking drive means and a part of optical components such as a reflecting mirror are included in a movable unit provided with the access drive means, thereby decreasing the weight of an optical disk drive unit. However, in this separate type optical head, there arises a difficulty that as the weight of the movable unit becomes smaller, the objective lens becomes supported by a system of double degree of freedom and the tracking control operation becomes unstable. A countermeasure for solving this problem of the unstableness in the tracking control operation, has been proposed in Japanese Patent Provisional Publication No. 2-68730 Official Gazette. It is another separate type optical head which comprises a movable bobbin having an objective lens and a tracking drive means, a transfer guide means, and a carriage having mass almost equal to the mass of the movable bobbin and connected to the movable bobbin through a plate spring and provided with a reflecting mirror and an access drive means guided in the transferable manner by the transfer guide means. In this optical head, the access drive means and the tracking drive means are simultaneously operated during the tracking control operation to electrically correct the movement of the system of a double degree of freedom supporting the objective lens. This conventional optical head, however, is disadvantageous in that the tracking control operation becomes complex and that the state of the tracking control operation changes due to a slight deviation in the spring constant of the plate spring or to variation in a sliding resistance of the transfer quide means to guide the carriage with the result that the state of the tracking control operation may become unstable. Therefore, the problem of the unstableness in the tracking control operation cannot satisfactorily be solved by this conventional optical head. Furthermore, the problem of decreasing the power consumption cannot be solved because the tracking drive means and the access drive means are simultaneously operated in this conventional optical head as above described.

SUMMARY OF THE INVENTION

It is accordingly an object of the present invention to provide a miniaturized low-power-consumption optical head which can stably perform the tracking control operation and seek a target track at a high speed.

To achieve the foregoing object and in accordance with the present invention, there is provided an optical head which comprises a movable bobbin having an objective lens for focusing a light beam on an information track formed on a recording medium, a carriage for holding the movable bobbin, transfer guide means for guiding the carriage in such a manner to be able to move in the tracking direction, bobbin supporting means for supporting the movable bobbin and guiding the bobbin to the carriage in such a fashion that the objective lens can move in the tracking direction, tracking drive means for driving the objective lens in the tracking direction and state transformation means for transforming the state of the bobbin and the carriage between a first state, in which the objective lens can move in the tracking direction but the carriage does not move in the tracking direction, and a second state, in which the movable bobbin and the carriage moves in the tracking direction as one body.

Thus, at the time of effecting a tracking operation, the state transformation means transforms the state of the bobbin and the carriage into the first state, in which the objective lens can move in the tracking direction but the carriage does not move in the tracking direction, and the tracking drive means is then operated. This results in the objective lens being supported by a system of single degree of freedom, of which characteristics are determined by the mass of the movable bobbin and the spring constant of the bobbin supporting means. Thereby, in comparison with the prior art, the optical head according to the present invention excels in tracking control characteristics. In contrast, at the time of acessing an information track, the state transformation means transforms the movable bobbin and the carriage into the second state, in which the bobbin and the carriage move in the tracking direction in one united body, and the tracking drive means is then operated. Thereby, the present invention can prevent the movable bobbbin from rocking at the time of performing the access operation. Further, compared with the prior art optical head which requires two drive means, i.e., requires both the tracking drive means and the access drive means as above described, the optical head according to the present invention, in which the tracking means can be used as the access drive means by employing the simple state transformation means. Thereby, with the optical head of the present invention, there can be less weight of a movable portion and lower power consumption of an optical head.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Figure 1:
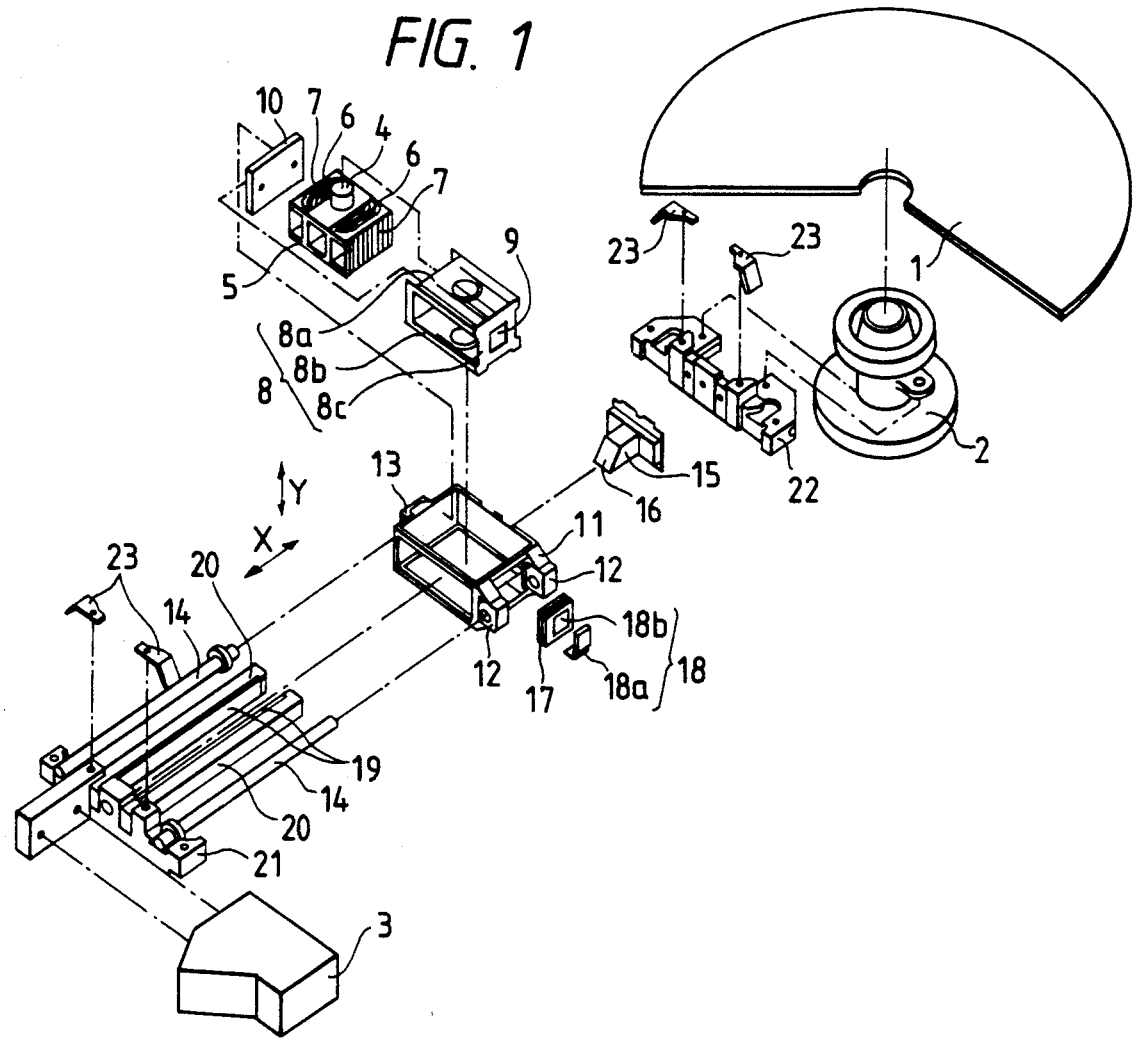
FIG. 1 is an exploded perspective view of a first embodiment of the present invention.
Figure 2:
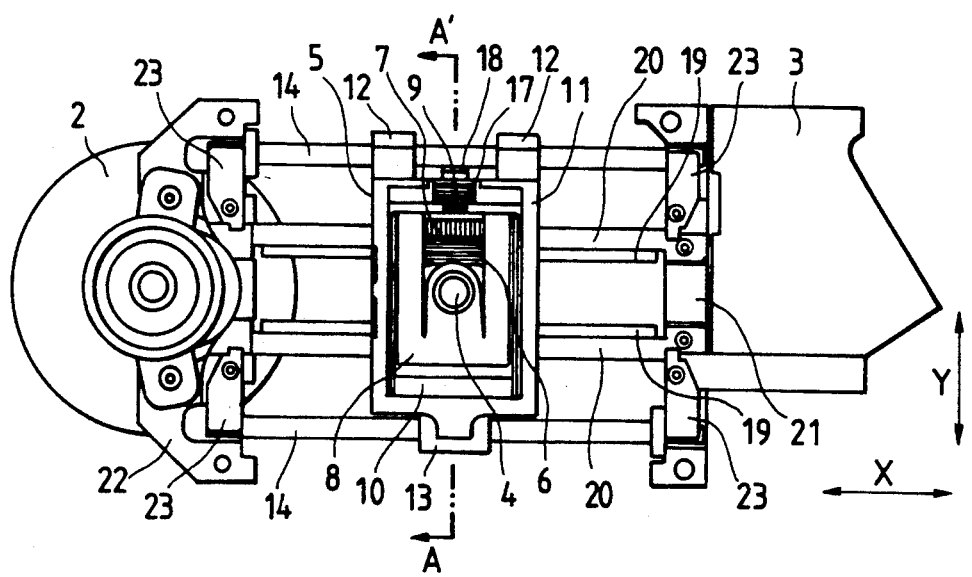
FIG. 2 is a plan view of the first embodiment of the present invention of FIG. 1.
Figure 3:
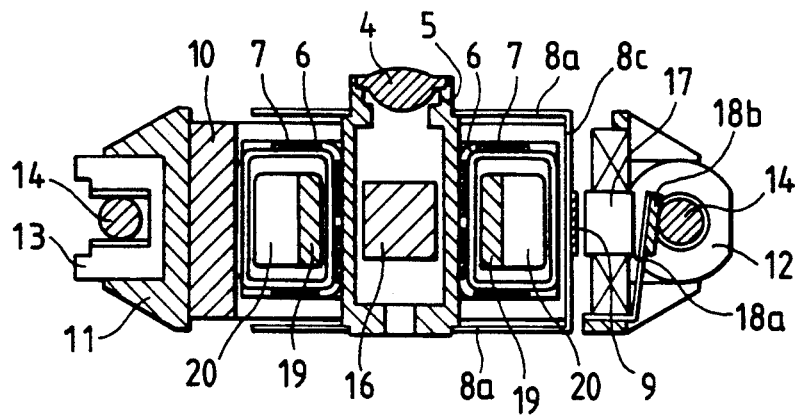
FIG 3 is a sectional view taken on line A—A.
Figure 4:
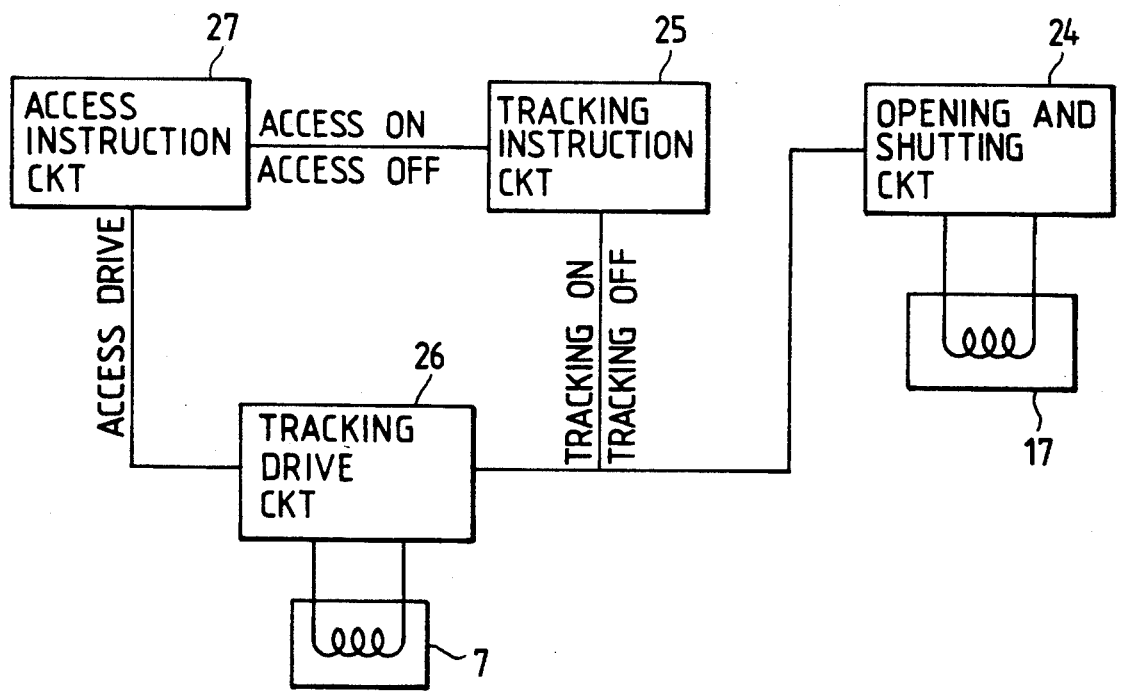
FIG. 4 is a block diagram for illustrating a tracking operation and an access operation of an optical head of the first embodiment.

By referring to FIGS. 1-4, there is shown the first embodiment of the present invention. In FIGS. 1 and 2, reference character X denotes a direction, called the tracking direction, which is perpendicular to an information track formed on a recording medium; and Y another direction, called the focusing direction, which is vertical to the recording medium. Further, reference numeral 1 represents the recording medium (an optical disk in case of this embodiment), on the surface of which information tracks are formed like spirals or concentric circles; 2 a disk motor equipped with and rotating the recording medium 1; 3 a fixed optical unit fixed by using screws to a side yoke A 21 for accommodating in a fixed member thereof a semiconductor laser serving as a light source, a photodetector used to detect a focus signal, a tracking signal and a reproducing signal from light reflected by the recording medium 1 and optical elements such as a prism used to transform a light beam emitted from the semiconductor laser into a parallel ray of light; 4 an objective lens for focusing the light beam on the recording medium 1; 5 movable bobbin for accommodating the objective lens 4; 6 a focus coil fixed to the movable bobbin 5 for driving the bobbin 5 in the Y-direction; 7 a tracking coil fixed to the bobbin 5 for driving the bobbin 5 in the X-direction; and 8 a bobbin supporting means comprised of a focus plate spring 8a capable of moving in the Y-direction, a tracking plate spring 8b capable of moving in the X-direction and a connecting member 8c, to which a magnetic attracting plate 9 is fixed. for connecting the focus plate spring 8a to the tracking plate spring 8b. Incidentally, one end portion of the focus plate spring 8a of the bobbin supporting means 8 is fixed to the bobbin 5, and on the other hand one end of the tracking plate spring 8b is a fixed to a fixed plate 10. In this way, the movable bobbin 5 is supported by the bobbin supporting means 8 in such a manner to be able to move in the X- and Y- directions. Reference numeral 11 indicates a carriage fixedly adhering to a bearing A 12, which is a cylindrical plain bearing, at one end thereof and to another bearing B 13, which is used to control the rotation of the carriage 11, at the other end thereof. Further, the carriage 11 is guided by a guide shaft 14, which is engaged with the bearing A 12 and the bearing B 13, in such a manner to be able to slide in the X-direction. The fixed plate 10, which is integral with the bobbin 5 and the bobbin supporting means 8, is fixed to a side wall of the carriage 11. Reference numeral 15 denotes a mirror holder fixed to the carriage 11 and provided with a reflecting mirror 16 for reflecting a light beam, which is emitted from the fixed optical unit 3 in the X-direction, in the Y-direction. Further, reference numeral 17 designates an electromagnet fixed to the carriage 11 in such a manner to be in opposing relation with the magnet attracting plate 9 in the connecting member 8c of the bobbin supporting means 8. When energized, this electromagnet 17 generates magnetic attracting force in the magnetic attracting plate 9 and controls the movement of the bobbin supporting means 8 in the tracking direction. Reference numeral 18 indicates a carriage stopper comprised of a plate spring 18a, which is capable of magnetic attraction, and a shock absorbing member 18b made of rubber or the like. This carriage stopper 18 is fixed to the carriage 11 in such a fashion to face the electromagnet 17. Incidentally, when the electromagnet 17 is not energized, the shock absorbing member 18b of the carriage stopper 18 becomes in touch with the guide shaft 14 so as to fixedly hold the carriage 11. When the electromagnet 17 is energized, the plate spring 18a is attracted by the electromagnet 17 and thus released from the carriage 11. The state transformation means is thus constituted by the magnetic attracting plate 9, the electromagnet 17 and the carriage stopper 18. Further, reference numeral 19 denotes a magnet; 20 a back yoke; 21 a side yoke A and 22 another side yoke B. The magnet 19, the back yoke 20 and the side yoke A 21 and the side yoke B 22 constitute a magnet circuit which drives the movable bobbin in the X- and Y-directions by use of electromagnetic force of the focus coil 6 and the tracking coils 7a and 7b. Reference numeral 23 designates a guide shaft supporting spring which is fixed by screws to the side yoke A 21 and the side yoke B 22, thereby fixing the guide shaft 14 to the side yoke A 21 and the side yoke B 22. Reference numeral 24 indicates an opening and shutting circuit for controlling the energizing of the electromagnet 17. This circuit deenergizes the electromagnet 17 in response to a tracking ON signal and energizes the electromagnet 17 in response to a tracking OFF signal. Additionally, reference numeral 25 denotes a tracking instruction circuit which generates the tracking ON signal and the tracking OFF signal; 26 a tracking drive circuit; and 27 an access instruction circuit.

Hereinafter, an operation of the thus constructed optical head, i.e., the first embodiment of the present invention will be described in detail.

First, a focus control operation of this embodiment will be described hereinbelow. When a focus drive current flows through the focus coil 6 in response to a focus signal detected by the photodetector of the fixed optical unit 3, drive force following the axial deflection of the optical disk 1 is caused in the focus coil 6 in the Y-direction by an electromagnetic effect between the coil 6 and the magnetic circuit. The movable bobbin 5 is supported by the focus plate spring 8a of the bobbin supporting means 8 in such a manner to be able to move in the Y-direction. Thus, the objective lens 4 provided in the movable bobbin 5 is driven in the focusing direction, and the focus is controlled.

Next, a tracking control operation of this embodiment will be described hereinbelow. During the focus control operation, the electromagnet 17 is deenergized by the opening and shutting circuit 24 when the tracking ON signal is input from the tracking instruction circuit 25 thereto. Thus, the magnetic attracting force between the magnet 17 and the magnetic attracting plate 9 of the connecting member 8c of the bobbin supporting means 8 is not generated. Therefore, the movement of the bobbin supporting means 8 is not inhibited and the movable bobbin can be moved by tracking plate spring 8b of the bobbin supporting means 8 in the X-direction. On the other hand, the shock absorbing member 18b of the carriage stopper 18 is in touch with the guide shaft 14. Thus, the carriage 11 is fixedly held by the carriage stopper 18. Therefore, the vibration characteristic of the movable bobbin 5 is that of a system of single degree of freedom determined by the mass of the movable bobbin 5 and the spring constant of the tracking plate spring 8b. In such a state, a control loop of the tracking drive circuit 26 closes in response to a tracking ON signal. Further, a drive current flows through the tracking coil 7 in response to a tracking signal detected by the photodetector of the fixed optical unit 3. Then, drive force is generated in the tracking coil 7 in the X-direction by the electromagnetic effect between the coil 7 and the mannetic circuit. As a result, the objective lens 4 provided in the movable bobbin 5 is driven in the tracking direction, and the tracking operation is controlled by following radial deflection of the optical disk 1. Thus, the control of the tracking operation comes to that of the vibration characteristic of a system of single degree of freedom. Thereby, in comparison with the prior art, the control performance can be more stable.

Next, an access control operation of this embodiment will be described in detail hereinbelow. During the focus control operation, the tracking instruction circuit 25 outputs a tracking OFF signal in response to an access ON signal sent from the access instruction signal 27. When the tracking OFF signal is input to the tracking drive circuit 26, a control loop thereof opens and thus the movement of the movable bobbin in the tracking direction is stopped. Further, the electromagnet 17 is energized by the opening and shutting circuit 24. Namely, attracting force is generated between the electromagnet 17 and the magnetic attracting plate 9 of the connecting member 8c of the bobbin supporting means 8 so that the movement of the bobbin supporting means 8 in the X-direction is inhibited and the movable bobbin 5 is held by the bobbin supporting means 8 in such a manner to be able to move only in the focussing direction. On the other hand, the plate spring 18a of the carriage stopper 18 is attracted by the electromagnet 17. This results in the shock absorbing member 18b being from the guide shaft 14. Namely, the movable bobbin 5 and the carriage 11 can move in the X-direction as one body. When a drive current flows through the tracking coil 7 in response to an access drive signal sent from the access instruction circuit 27 in such a state of this embodiment, the movable bobbin 5 and the carriage 11 move in one united body in the X-direction and the access control operation is effected. Thus, in the access operation, the rocking motion of the movable bobbin 5 does not occur. Therefore, in comparison with the prior art, this embodiment can have more stable access control performance. Further, in this embodiment, the carriage 11 is firmly held to the guide shaft 14 during the tracking control operation and therefore the carriage 11 is hard to move when shocked or vibrated. Thus, can be obtained an optical head which excels in vibration characteristics.

Incidentally, in this embodiment, the guide shaft is employed as means for fixing the carriage. It is apparent that another appropriate fixing member can be used instead of the guide shaft.

Hereinafter, the second embodiment of the present invention will be described in detail by referring to FIG. 5. In this figure, like reference numerals designate like or corresponding portions shown in FIGS. 1-3. The explanation of such portions is omitted herein for simplicity of description.

Figure 5:
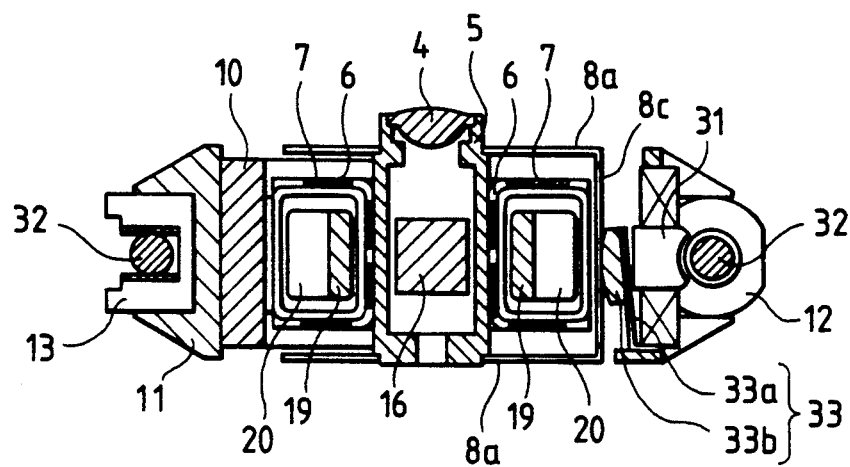
FIG. 5 is a sectional view of a primary part of a second embodiment of the present invention.

In FIG. 5, reference numeral 31 denotes an electromagnet fixed to the carriage 11 and facing a guide shaft 32 made of material, which is capable of magnetic attraction. When energized, the movement of this magnet in the X-direction is prevented by the magnetic attracting force caused between this magnet and the guide shaft 32. Reference numeral 33 designates a movable bobbin stopper comprised of a plate spring 33a, which is capable of magnetic attraction, and a shock absorbing member 33b made of rubber or the like. This carriage stopper 33 is fixed to the carriage 11 in such a fashion to face the electromagnet 31. Further, when the electromagnet 31 is not energized, the shock absorbing member 33b of the movable bobbin stopper 33 becomes in contact with the connecting member 8c of the bobbin supporting means 8 so as to firmly hold the bobbin supporting means 8. When the electromagnet 31 is energized, the plate spring 33a is attracted by the electromagnet 31, and thus released from the connecting member 8c of the bobbin supporting means 8.

Thereby, this embodiment can exhibit the tracking control characteristics and the access control characteristics similar to those of the first embodiment. Further, in the second embodiment, the guide shaft is not in touch with the stopper. Thus, it is hard to scratch and make dust adhere to the guide shaft. This enhances reliability of the optical head.

Figure 6:
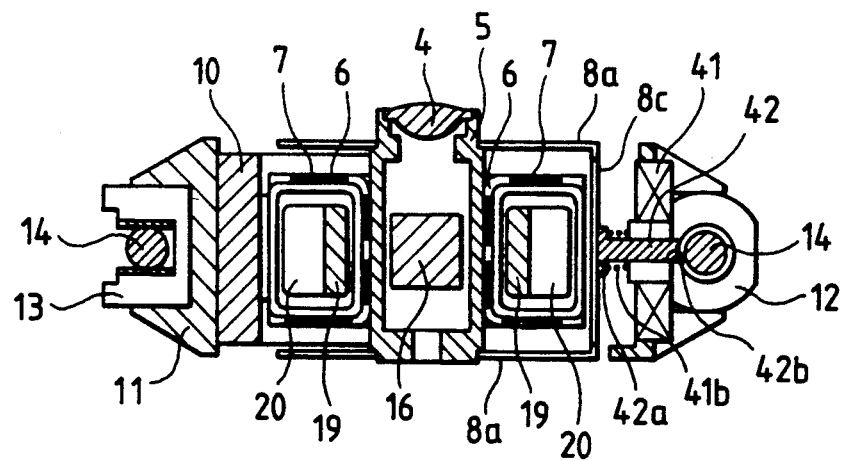
FIG. 6 is a sectional view of a primary part of a third embodiment of the present invention.

Turning now to FIG. 6, the third embodiment of the present invention will be described in detail hereunder. In FIG. 6, like reference numeral denote like or corresponding portions shown in FIGS. 1-3. Therefore, the explanation of such portions is omitted herein for simplicity of description.

Referance numeral 41 denotes a solenoid type electromagnet which is secured to the carriage 11 and has a solenoid pin 42 capable of sliding. An end portion 42a of the solenoid pin 42 is pushed by a coil spring 41b. When the solenoid type electromagnet 41 is not energized, the end portion 42a is in contact with the connecting member 8c of the bobbin supporting means 8. In contrast, when the electromagnet 41 is energized, the solenoid pin 42 is attracted by the electromagnet 41, so that the end portion 42a is released from the connecting member 8c of the bobbin supporting means 8 and is then in touch with the guide shaft 14.

Thereby, this embodiment can also exhibit the tracking control characteristics and the access control characteristics similar to those of the above described embodiments.

Figure 7:
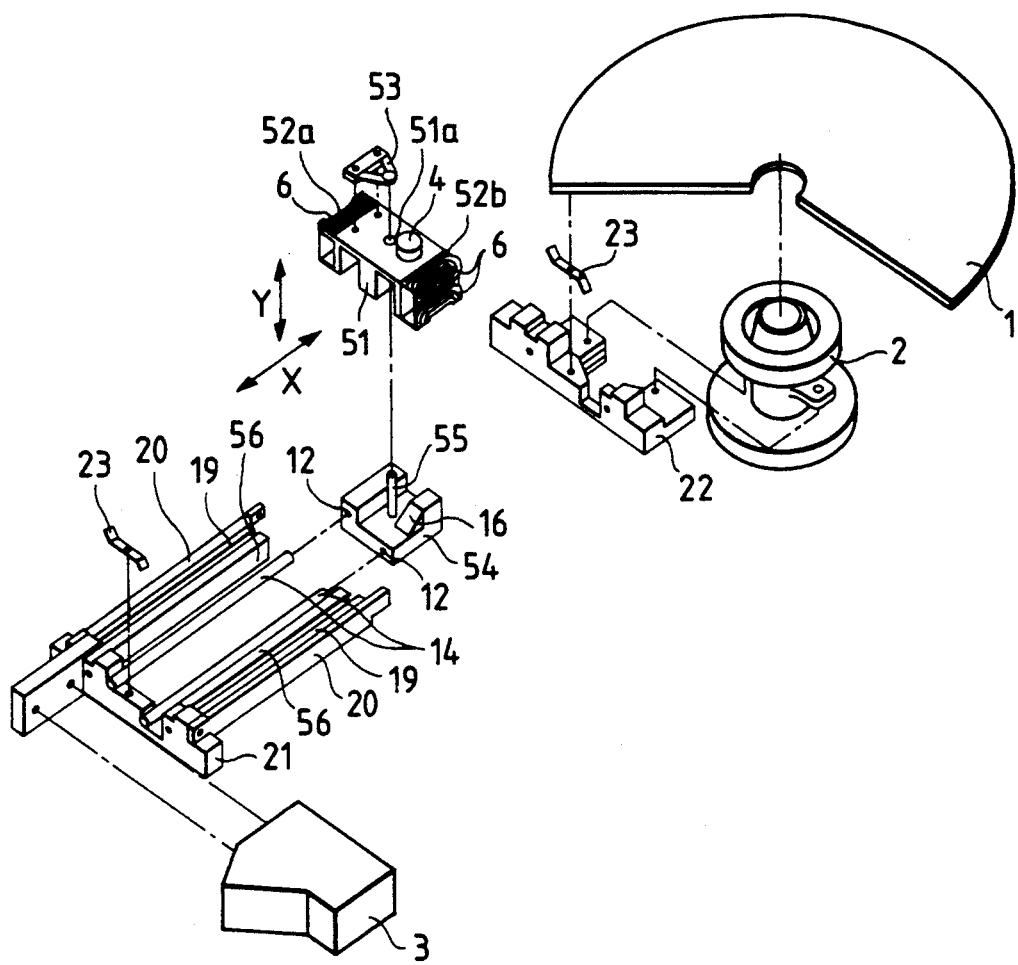
FIG. 7 is an exploded perspective view of a fourth embodiment of the present invention.
Figure 8:
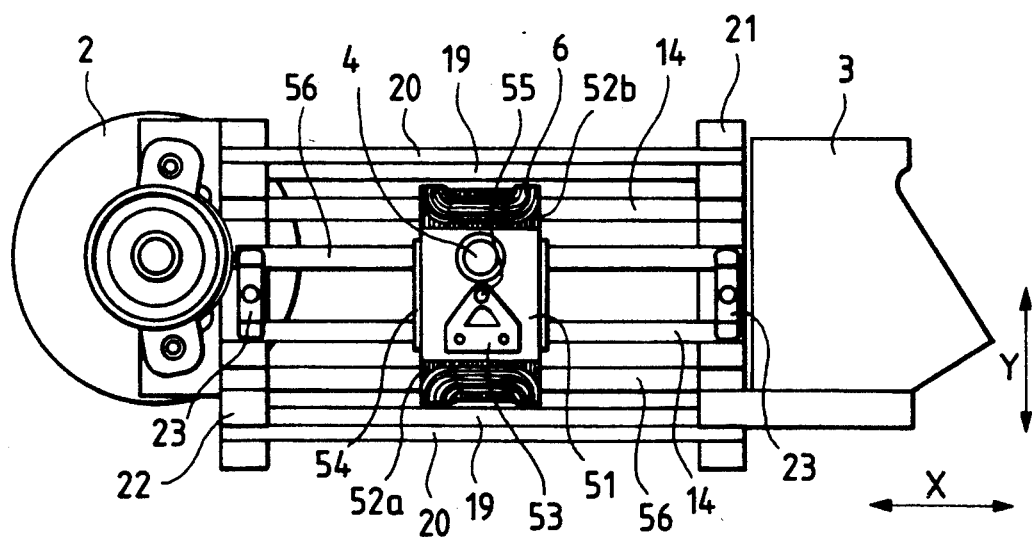
FIG. 8 is a plan view of the fourth embodiment of the present invention.
Figure 9:
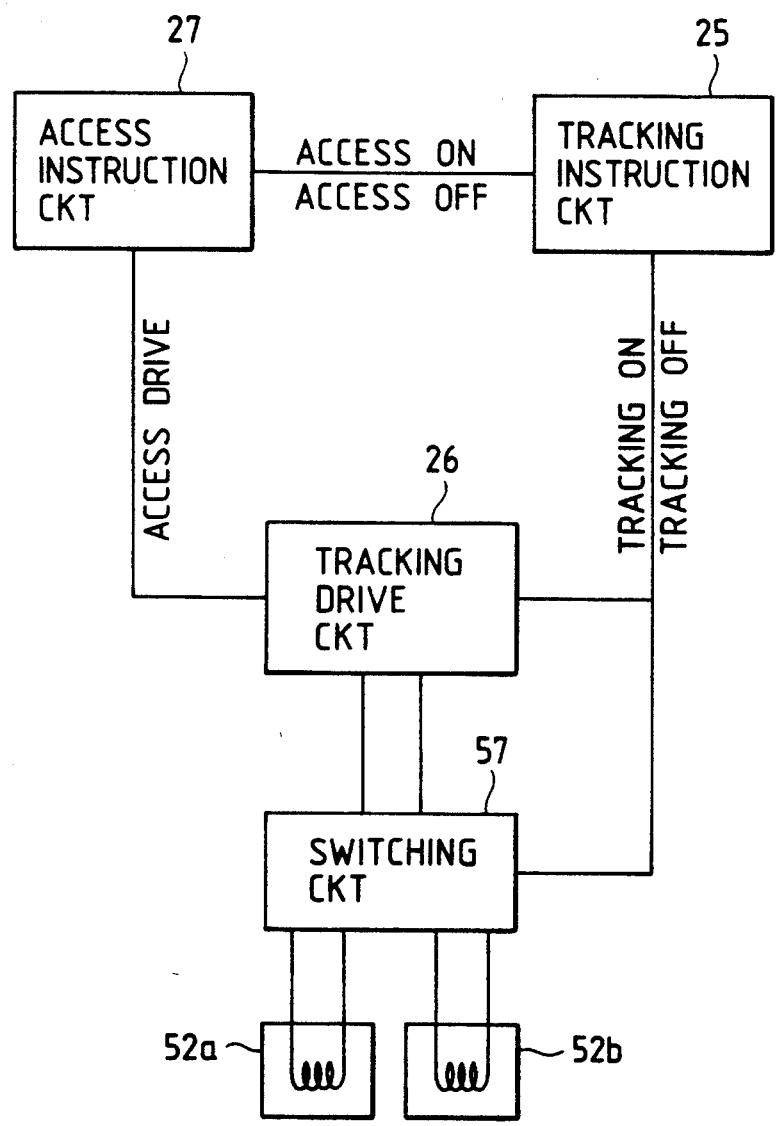
FIG. 9 is a block diagram for illustrating a tracking operation and an access operation of an optical head of the fourth embodiment of the present invention.

Next, the fourth embodiment of the present invention will be described hereinbelow by referring to FIGS. 7-9. In these figures, like reference numerals denote like or corresponding portions shown in FIGS. 1-4. Therefore, the explanation of such portions is omitted herein for simlicity of description.

Reference numeral 51 is a movable bobbin in which a hole 51a is bored. Further, this movable bobbin 51 is supported by a bearing 12 in such a manner to be able to pivot upon a support shaft 55, which penetrates the hole 51a, and slide along the axis of the support shaft 55. Furthermore, an objective lens 4 is fixedly mounted on the movable bobbin 51 and spaced apart a very short distance from the support shaft 55 in such a fashion to be able to move in the tracking direction. In addition, a focus coil 6, which is used to drive the movable bobbin 51 in the Y-direction, and tracking coils 52a and 52b, which are used to drive the bobbin 51 in the X-direction or make the bobbin 51 pivot upon the support shaft 55, are respectively fixed to the bobbin 51 at the positions of symmetry with respect to the shaft 55, as viewed in FIG. 8. Incidentally, the polarity of an electric current flowing through each of the tracking coils 52a and 52b can be switched by a switching circuit 57, which operates in response to a tracking ON and tracking OFF signals issued from a tracking instruction circuit 25. Further, the movable bobbin 51 is manufactured such that mass distribution thereof be symmetrical with respect to the support shaft 55. Reference numeral 53 designates an elastic member which is fixed to the movable bobbin 51 at an end thereof and to the support shaft 55 at the other end thereof. The elastic member 53 serves to restrain the movement of the bobbin 51 in the Y-direction and the rotative or pivotal motion of the bobbin 51 around the support shaft 55 and hold the objective lens 4 at a neutral position. The support shaft 55 is planted in and a reflecting mirror 16 and a bearing 12 are secured to a carriage 54. Further, a magnetic circuit is comprised of a magnet 19, a back yoke 20, a side yoke A 21, a side yoke B 22 and opposed yokes 56. The opposed yokes 56 serve to prevent leakage of magnetic flux derived from the magnet 19 and further prevent magnetic attracting force from acting on the support shaft 55 in the case where the shaft 55 is made of magnetic material.

Hereinafter, a tracking control operation and an access control operation of the fourth embodiment of the present invention will be described in detail.

First, the tracking control operation of the fourth embodiment will be described hereinbelow. When a tracking ON signal is input from a tracking instruction circuit 25 to the switching circuit 57, the polarity of the electric current flowing through each of the tracking coils 52a and 52b is reversed. Further, in response to the tracking ON signal, a control loop of the tracking drive circuit 26 closes and a drive current flows through the tracking coils 52a and 52b in accordance with a tracking signal. When the drive current flows, a drive force is caused in the X-direction in the tracking coils 52a and 52b by the electromagnetic effect acting between the tracking coil and the magnetic circuit. The drive force, however, serves as an axial moment force acting about the support shaft 55 because the direction of the drive force caused by the tracking coil 52a is opposite to that of the drive force caused by the tracking coil 52b. The movable bobbin 51 is supported by the bearing 12 in such a manner to be able to pivot upon the support shaft 55 and is held by the elastic member 53 in neutral so as to pivot on the shaft 55 held at the neutral position. Further, the objective lens 4 held and spaced apart a very short distance from the support shaft 55 is driven in the tracking direction, and the tracking operation is thus controlled. At that time, in the movable bobbin 51, no translation force is produced in the X-direction. Therefore, the carriage 54 engaged with the movable bobbin 51 through the support shaft 55 is stationary. The tracking operation is thus controlled only by making use of the rotative or pivotal motion of the movable bobbin 51. Thus, the control of the tracking operation of this embodiment comes to that of the vibration characteristic of a system of single degree of freedom. Thereby, the control performance of this embodiment can be more stable in comparison with the prior art. Additionally, the movable mass of this embodiment becomes smaller than that of the conventional optical head. Thus, the drive current can be small.

Next, the access control operation of this embodiment will be described hereinbelow. First, in response to an access ON signal output from the access instruction circuit 27, the tracking instruction circuit 25 outputs a tracking OFF signal. The control loop of the tracking drive circuit 26 opens in response to the tracking OFF signal. Then, the movement of the movable bobbin in the tracking direction is stopped and further the switching circuit 57 operates. Thus, the polarity of the electric current flowing through the tracking coil 52a becomes the same as that of the electric current flowing through the tracking coil 52b. Further, when the drive current flows through each of the tracking coils 52a and 52b in response to the access drive signal output from the access instruction circuit 27, a drive force is produced in the X-direction in each of the coils 52a and 52b by the magnetic effect acting between the magnetic circuit and each of the coils. However, in the movable bobbin 51, a moment force is not produced but a translation drive force is produced in the X-direction because the direction of the drive force produced by the coil 52a is the same as that of the drive force produced by the coil 52b. The carriage 54 is engaged with the movable bobbin 51 through the support shaft 55. Thus, the movable bobbin 51 and the carriage 54 move in one united body in the X-direction. The access operation is then controlled. Incidentally, at that time, the movable bobbin 51 does not rock substantially because no moment force is produced in the bobbin 51. Therefore, in comparison with the prior art, this embodiment also can have more stable access control performance.

Furthermore, in case of this embodiment, the carriage is not equipped with state transformation means as provided in the first, second and third embodiments. Therefore, there can be less weight of the movable portions of this embodiment.

While preferred embodiments of the present invention have been described above, it is to be understood that the present invention is not limited thereto and that other modifications will be apparent to those skilled in the art without departing from the spirit of the invention. For example, the carriage 54 is provided with the support shaft 55 in the fourth embodiment. However, it is apparent that substantially the same effects can be obtained by equipping the movable bobbin 51 with the support shaft 55 and boring a hole, through which the shaft 55 penetrates, in the carriage 54. Further, in the fourth embodiment, the mass distribution of the movable bobbin 51 is made to be symmetrical with respect to the support shaft 55, and the same tracking coils 52a and 52b are secured to the movable bobbin 51 in such a manner to be symmetrical with respect to the support shaft 55. However, it is evident that even if the mass distribution of the movable bobbin 51 becomes unbalanced, substantially the same effect can be obtained by making axial moment forces produced by the tracking coils, which are respectively placed at positions of symmetry with respect to a supporting axis for the pivotal motion, nearly equal to each other. Furthermore, the above described embodiments are separate type optical heads, in each of which an optical head is separated into a fixed optical unit and a movable optical unit. The present invention, however, can be effectively applied to an integral type optical head, the whole of which is adapted to be moved, on condition that the weight of the optical head is small and the ratio of the mass of the carriage to the mass of the movable bobbin is small.

The scope of the present invention, therefore, is to be determined solely by the appended claims.

What is claimed is:

1. An optical head comprising:
   a movable bobbin having an objective lens for focusing a light beam on an information track formed on a recording medium;
   a carriage for holding said movable bobbin;
   transfer guide means for guiding said carriage in such a manner that said carriage can move in a tracking direction;
   bobbin supporting means for supporting said movable bobbin and guiding said movable bobbin to said carriage in such a fashion that the objective lens can move in the tracking direction and in a focusing direction, said carriage being able to be connected with and released from a fixed portion outside said carriage and said bobbin supporting means in a manner such as to restrain a movement of said movable bobbin in the tracking direction;
   tracking drive means having tracking coils, each of which is connected to said movable bobbin for driving the objective lens in the tracking direction and further having a magnetic circuit placed in a position spaced a predetermined distance from said carriage for generating magnetic flux across said tracking coils;
   focus drive means for driving the objective lens in the focusing direction; and
   state transformation means for changing the relative positions of said movable bobbin and said carriage from a first state, in which the objective lens can move in the tracking direction but said carriage does not move in the tracking direction, to a second state, in which said movable bobbin and said carriage move in the tracking direction as one body by releasing said carriage from said fixed portion and connecting said carriage to said bobbin supporting means, the state transformation means further changing the relative positions of said movable bobbin and said carriage from the second state to the first state by releasing said carriage from said bobbin supporting means and connecting said carriage to said fixed portion.

2. An optical head comprising:
   a movable bobbin for holding an objective;
   a carriage for holding said movable bobbin;
   transfer guide means for guiding said carriage in such a manner that said carriage can move in a tracking direction;
   bobbin supporting means for elastically supporting said movable bobbin and guiding said movable bobbin to said carriage in such a fashion that the objective lens can move in the tracking direction and in a focusing direction, said carriage being able to be connected with and released from a fixed portion outside said carriage and said bobbin supporting means in a manner such as to restrain a movement of said movable bobbin in the tracking direction;

tracking drive means having tracking coils, each of which is connected to said movable bobbin for driving the objective lens in the tracking direction and further having a magnetic circuit placed in a position spaced a predetermined distance from said carriage for generating magnetic flux across said tracking coils;

focus drive means for driving the objective lens in the focusing direction; and state transformation means for changing the relative positions of said movable bobbin and said carriage between a first state and a second state, said carriage being connected to said bobbin supporting means and being released from said fixed portion in the first state, said carriage being connected to said fixed portion and being released from said bobbin supporting means in the second state.

3. The optical head as set forth in claim 2, wherein said bobbin supporting means comprises a focus plate spring, a tracking plate spring and a connecting member; and wherein in the first state said carriage is connected to said connecting member of said bobbin supporting means and is released from said fixed portion; and wherein in a second state said carriage is connected to said fixed portion and is released from said connecting member of said movable bobbin.

4. The optical head as set forth in claim 3, wherein a magnetic attracting member is included in said connecting member of said bobbin supporting means; and further wherein said state transformation means comprises an electromagnet for attracting said magnetic attracting member included in said connecting member of said bobbin supporting means to said carriage, a carriage stopper which can be attracted by said electromagnet and which can be in contact with said fixed portion but is released from said fixed portion when said electromagnet is energized, and an opening and shutting circuit for controlling the energizing of said electromagnet.

5. The optical head as set forth in claim 3, wherein said transfer guide means comprises a bearing provided in said carriage and a guide shaft made of magnetic attracting material; and further wherein said state transformation means comprises an electromagnet for attracting said guide shaft of said transfer guide means to said carriage, a carriage stopper which can be attracted by said electromagnet and can be in contact with said connecting member of said bobbin supporting means but is released from said connecting member when said electromagnet is energized, and an opening and shutting circuit for controlling the energizing of said electromagnet.

6. The optical head as set forth in claim 3, wherein said state transformation means comprises a solenoid type electromagnet which is fixed to said carriage and has a solenoid pin pushed by a spring to said connecting member, and an opening and shutting circuit for controlling the energizing of said solenoid type electromagnet, and wherein when said electromagnet is not energized the solenoid pin is in contact with said connecting member and when said electromagnet is energized, the solenoid pin is not in contact with the other of said connecting member and said fixed portion.

7. An optical head comprising:

a movable bobbin for holding an objective lens;

a carriage for holding said movable bobbin;

transfer guide means for guiding said carriage in such a manner that said carriage can move in a tracking direction; bobbin supporting means arranged in said carriage and engaged with said movable bobbin for supporting said movable bobbin in such a fashion that the said movable bobbin can pivot upon an axis orthogonal to the tracking direction and can move in a focusing direction;

tracking drive means having:
 said objective lens, which is fixed at a position spaced a predetermined distance from said axis for a pivotal motion of said movable bobbin and can move in the tracking direction;
 at least one pair of tracking coils secured in proximate positions symmetrical with respect to the supporting axis for the pivotal motion of said movable bobbin;
 a magnetic circuit placed at a position, which is spaced a predetermined distance apart from said carriage, for generating magnetic flux across said tracking coils;
 focus drive means for driving said objective lens in the focusing direction; and
state transformation means having a switching circuit for switching a polarity of an electric current flowing through each of said tracking coils which are placed at positions symmetrical with respect to the supporting axis for the pivotal motion of said movable bobbin.

8. The optical head as set forth in claim 7, wherein axial moment forces produced by said tracking coils, which are respectively placed in proximate positions symmetrical with respect to the supporting axis for the pivotal motion of said movable bobbin, are nearly equal in magnitude.

9. The optical head as set forth in claim 8, wherein a mass distribution of said movable bobbin is symmetrical with respect to the supporting axis for the pivotal motion of said movable bobbin.

10. An optical head comprising:

a movable bobbin for holding an objective lens;

a carriage for holding said movable bobbin;

transfer guide means for guiding said carriage in such a manner that said carriage can move in a tracking direction;

bobbin supporting means constituted by a support shaft which is planted in said carriage and engaged with said movable bobbin for supporting said movable bobbin in such a fashion that said movable bobbin can pivot upon an axis orthogonal to the tracking direction and can move in a focusing direction;

tracing drive means having;
 an objecting lens, which is fixed at a position spaced a predetermined distance from a supporting axis for a pivotal motion of said movable bobbin and can move in the tracking direction;
 at least one pair of tracking coils securing in proximate positions symmetrical with respect to the supporting axis for the pivotal motion of said movable bobbin;
 a magnetic circuit placed at a position, which is spaced a predetermined distance apart from said carriage, for generating magnetic flux across said tracking coils;

focus drive means for driving said objective lens in the focusing direction; and state transformation means having a switching circuit for switching a polarity of an electric current flowing through each of said tracking coils which are placed at positions symmetrical with respect to the supporting axis for the pivotal motion of said movable bobbin.

11. The optical head as set forth in claim 10, wherein axial moment forces produced by said tracking coils, which are respectively placed in proximate positions symmetrical with respect to the supporting axis for the pivotal motion of said movable bobbin, are nearly equal in magnitude.

12. The optical head as set forth in claim 10, wherein a mass distribution of said movable bobbin is symmetrical with respect to the supporting axis for the pivotal motion of said movable bobbin.

* * * * *